Marshall & Smith,
Basin Faucet.
Nº 17,511.                          Patented June 9, 1857.

UNITED STATES PATENT OFFICE.

WILLIAM C. MARSHALL AND HORACE W. SMITH, OF HARTFORD, CONNECTICUT.

BASIN-FAUCET.

Specification of Letters Patent No. 17,511, dated June 9, 1857.

*To all whom it may concern:*

Be it known that we, WILLIAM C. MARSHALL and HORACE W. SMITH, both of the city of Hartford, county of Hartford, and State of Connecticut, have invented a new and useful Improvement in Modes of Constructing Water-Cocks; and we do hereby declare that the following is a correct description of the same, reference being had to the accompanying drawing and to the letters of reference marked thereon.

The nature of our invention consists in the application and combination of a hot and cold water basin cock.

To enable others skilled in the art to make and use our invention we will proceed to describe its construction and operation.

Figure 2:
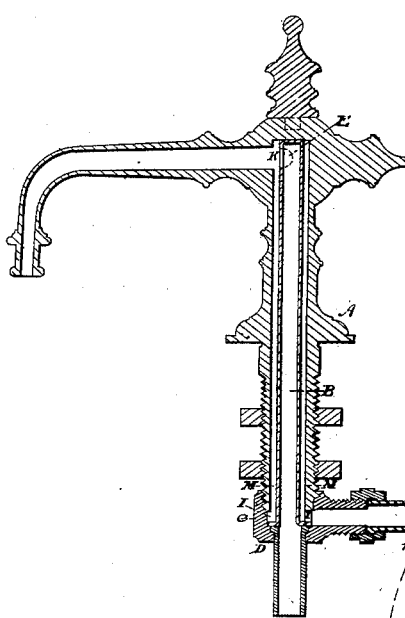
Figure 1:
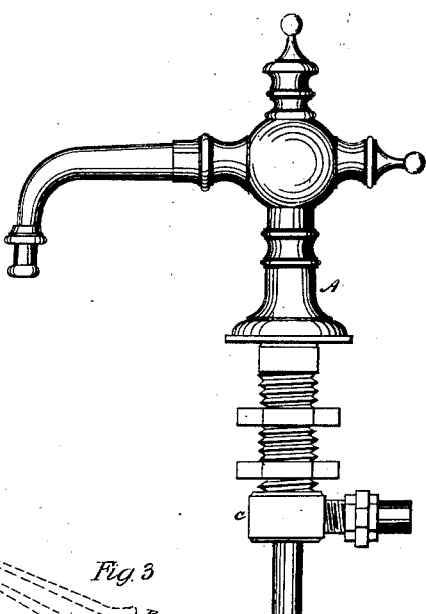
Figure 3:
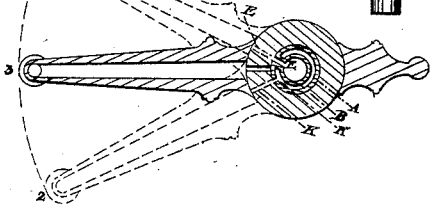

*The drawing.*—Figure 1 is a view of the combined basin cock. Fig. 2 is a section showing water courses &c. Fig. 3 is a section showing movements of the cock.

The usual mechanical construction of the cock connecting, pipes and other items required we manufacture in the customary manner. We make the main stem or column A Fig. 2 of the necessary dimensions with proper water courses &c. In the inside of this stem A we place another pipe B, to form the inner water course, allowing a sufficient space around the same for the passage of the water of stem A. Either one or the other of these pipes can be used for hot or cold water. At the bottom at C, they are connected in the following manner: One pipe say the pipe G shall be for hot water which enters directly into the inner tube B through the coupling D, and passes up to the slot E inside of the ball and into the discharging nozzle F, and through the same. The ball and nozzle being turned as shown in Fig. 3—1 allows the flow of the hot water through the slot E, at the same time it covers up the slot K, and prevents the passage of the cold water through the same. The other pipe H, shall be for cold water which enters through this pipe and through the holes I into the outer water course M of the main stem A, up to the slot K and into the discharging nozzle F, and through the same. The ball and nozzle being turned as shown in Fig. 3—2 allows the flow of the cold water through the slot K, at the same time it covers up the slot and prevents the passage of the hot water through the same. Thus by simply turning the nozzle and ball either way so as to cover one of the slots the other one will be open, and either hot or cold water can be drawn at discretion.

When the nozzle and ball is turned and placed in the center, as shown in Fig. 3—3, the ball covers both slots and prevents the egress of either hot or cold water.

Fig. 3 describes the three positions of the nozzle. No. 1 is for drawing the hot water. No. 2 is for drawing the cold water. No. 3 is to stop both the outlets.

Stop cocks are placed on the feed pipes to regulate the passage of the water in the usual manner. The utility of this arrangement is in its convenience and economy for baths and other purposes.

What we claim as our invention and desire to secure by Letters Patent is—

The arrangement, application, and combination, as herein described for drawing hot or cold water through one nozzle, in the manner and for the purpose substantially as herein set forth and described.

WM. C. MARSHALL.
HORACE W. SMITH.

Witnesses:
WM. VINE,
HENRY FRANCIS.